Dec. 11, 1962 J. G. ABSALOM 3,067,761
DEVICE FOR REGULATING FLUID SUPPLY PRESSURE
Filed March 11, 1960 2 Sheets-Sheet 2
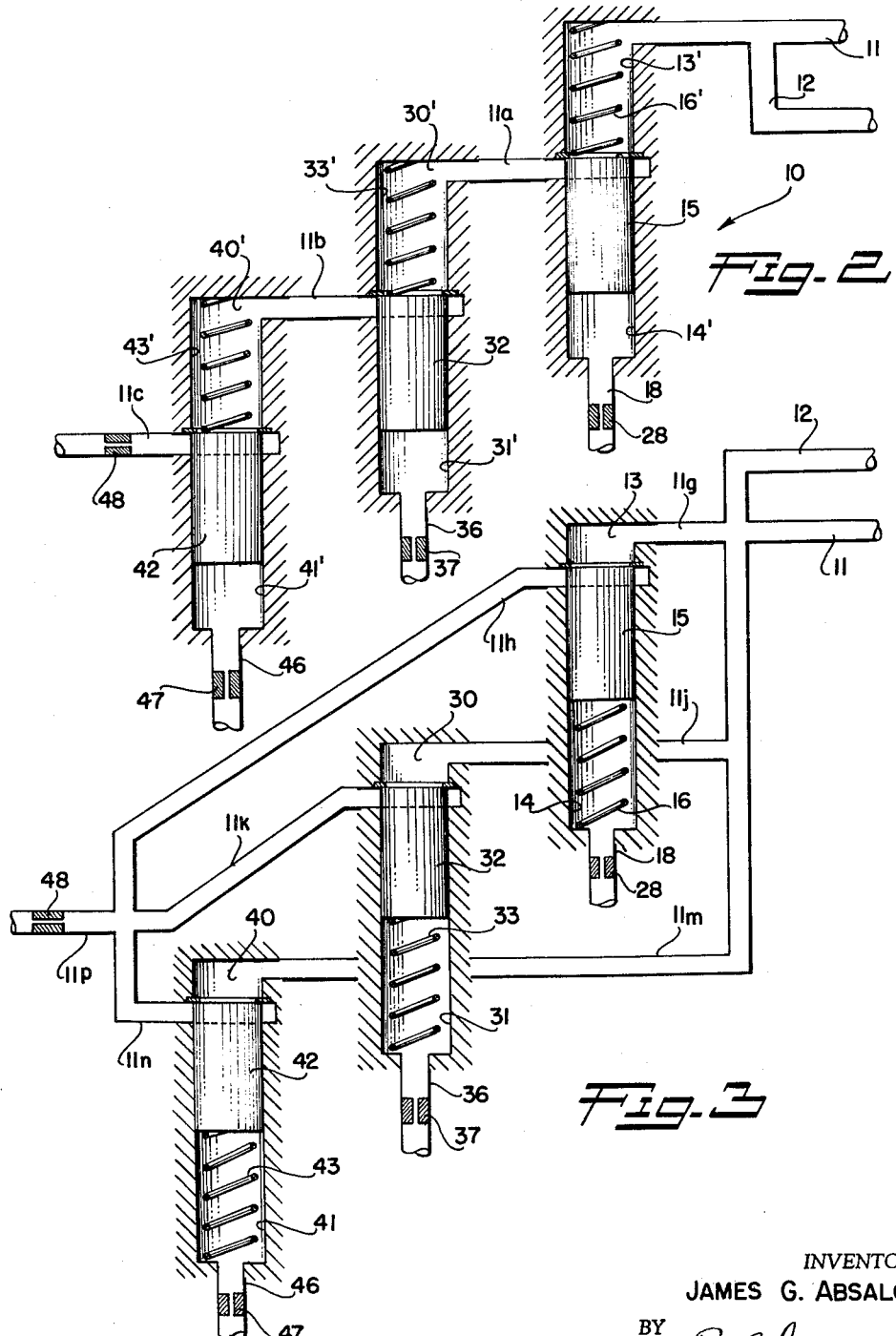
INVENTOR.
JAMES G. ABSALOM
BY
R. E. Geangue
Attorney ns Patent Office
3,067,761
Patented Dec. 11, 1962

3,067,761
DEVICE FOR REGULATING FLUID SUPPLY
PRESSURE
James G. Absalom, Canoga Park, Calif., assignor to The
Marquardt Corporation, Van Nuys, Calif., a corporation of California
Filed Mar. 11, 1960, Ser. No. 14,277
7 Claims. (Cl. 137—108)

This invention relates to a device for regulating fluid supply pressure to a system and more particularly to a regulating device for maintaining a supply pressure determined by the value of one of the sensed pressures to which the device is responsive.

While a plurality of pressures have been sensed to perform a proportioning or other flow control operation in a fluid system, the present invention is responsive to a number of sensed working pressures in a system to maintain the fluid supply pressure at the desired value. The invention is particularly adaptable in a hydraulic power system having a positive displacement pump so that the supply pressure can be regulated to the minimum required by the system components, thereby minimizing heat rejection into the system and minimizing pump power.

All forms of the invention utilize a system bypass flow as the only working fluid and the fluid supply pressure to the system is present in a passage connected between the source pressure and a variable bypass. On one form of the invention, the bypass flow is responsive to the maximum working pressure required by any component in the system at any time. In other words, the device regulates the system supply pressure by controlling the rate of bypass flow diverted from the system in accordance with the maximum sensed pressure. Each pressure sensed by the device acts against one end of a corresponding free floating bypass valve and the other ends of all the valves are arranged to provide for flow in series in the bypass passage between the source and a fixed discharge restriction. The floating valve subject to the maximum working pressure controls the effective bypass area since each valve is biased with a spring acting with the sensed working pressure on the valve.

In another form of the invention, the regulator will maintain the system pressure at a preset differential below the highest working pressure since the biasing springs act on the floating valves against the sensed pressures. In still another form of the invention, the floating valves are arranged for parallel flow paths in the bypass between the fluid source and a fixed discharge restriction so that the lowest pressure sensed by the regulator will regulate the system.

It is therefore an object of the present invention to provide a device for regulating fluid supply pressure to a system at a preset value with respect to one of the sensed pressures supplied to the device.

Another object of the invention is to provide a device for regulating fluid supply pressure in a system in which the maximum pressure sensed by the device determines a bypass flow rate from the system in order to regulate the system supply pressure.

A further object of the invention is to provide a device for regulating fluid supply pressure, which device comprises a plurality of free floating valves, arranged for series or parallel bypass flow from a pressure source, each valve being responsive to a single sensed pressure.

These and other objects of the invention not specifically set forth above will become readily apparent from the accompanying description and drawings, in which:

FIGURE 2 is a diagrammatic illustration of another form of regulator wherein the floating valves are spring biasing against the sensed pressures; and FIGURE 3 is a diagrammatic view of still another form of the invention wherein the floating valves are arranged for parallel bypass flow from the fluid source.

Figure 1:
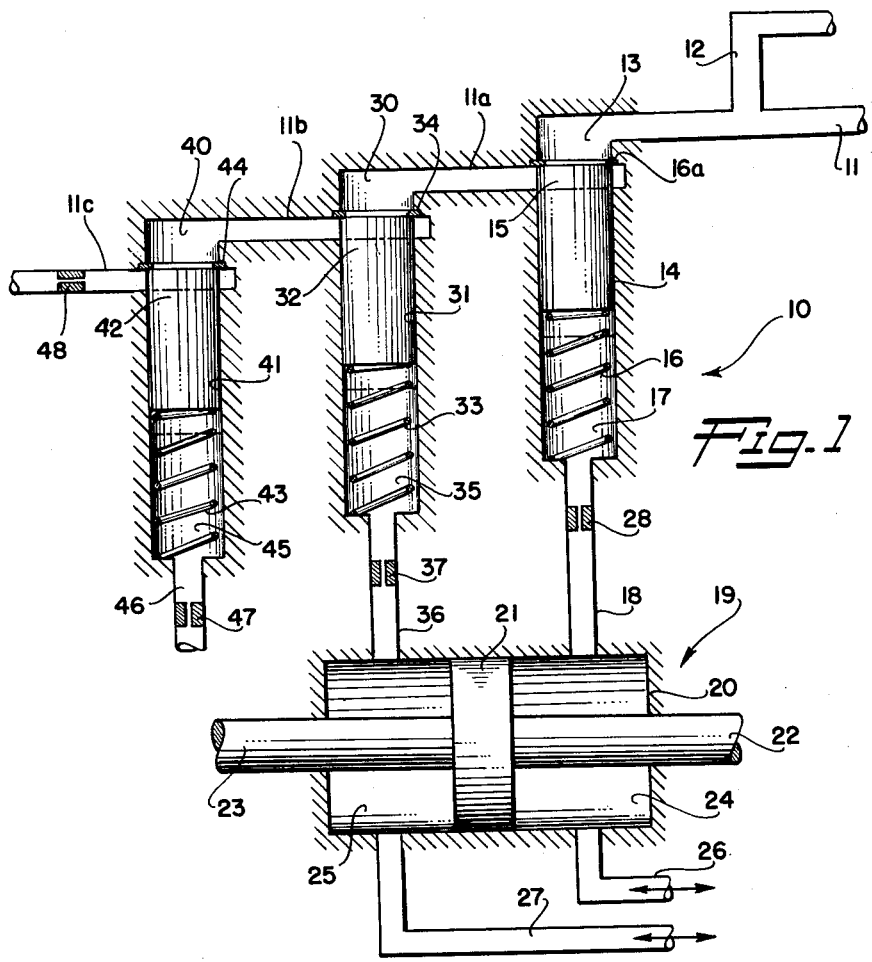
FIGURE 1 is a diagrammatic illustration of a pressure regulator which senses three working pressures and which has three free floating valves arranged for series bypass flow.

Referring to the embodiment of the invention illustrated in FIGURE 1, the regulator 10 is connected with a fluid supply source such as a hydraulic pump through passage 11, and passage 12 connects a system (not shown) with the regulator 10. As will be described, the passage 12 in this embodiment contains a fluid supply pressure which is always a preset differential above the highest sensed pressure.

Passage 11 connects with a chamber 13 at one end of cylinder 14 and a second portion 11a of passage 11 communicates with the cylinder at a position displaced from said one end of the cylinder. The cylinder 14 contains a free floating valve 15 and a spring 16 which normally holds the valve against stop shoulder 16a in cylinder 14 when no fluid pressure is present in chamber 13. When the valve is against the stop, the passage portion 11a is completely blocked from communication with chamber 13. Space 17 at the other end of cylinder 14 is connected with a passage 18 which senses a working pressure in a component of the system. For purposes of illustration, the component is illustrated as an actuator 19 comprising a cylinder 20 containing a piston 21 connected with actuating shafts 22 and 23. The piston 21 divides the cylinder 20 into spaces 24 and 25 and the spaces are supplied with fluid from a servo valve in the system (not shown) through passages 26 and 27, respectively. The passage 18 connects with space 24 to continually sense the working pressure therein and the passage contains a restriction 28 for introducing viscous damping as required for dynamic stability of the device.

The passage portion 11a connects with a chamber 30 at one end of a cylinder 31 and a third portion 11b of passage 11 communicates with cylinder 31 at a position spaced from passage portion 11a. The cylinder 31 contains a free floating valve 32 and a spring 33 which normally holds the valve against stop 34 when no fluid pressure is present in chamber 30. When valve 32 is against the stop, the passage portion 11b is completely blocked from communication with chamber 30. Space 35 at the other end of cylinder 31 is connected by a passage 36 with the actuator space 25 in order to continually sense the working pressure in this space. The passage 36 contains a viscous damping restriction 37 for dynamic stability of the regulator 10.

Any number of free floating valves may be arranged in series in the same manner as valves 15 and 32. For instance, passage portion 11b connects with chamber 40 at one end of cylinder 41 and a fourth portion 11c of passage 11 communicates with cylinder 41 at a position spaced from passage portion 11b. The cylinder 41 contains a free floating valve 42 and a spring 43 which normally holds the valve against stop 44 when no fluid pressure is present in chamber 40. When valve 42 is against the stop, the passage portion 11c is blocked against communication with chamber 40. Space 45 at the other end of cylinder 41 connects with passage 46 which contains a viscous damping restriction 47 and passage 46 can continually sense the pressure level existing at any selected component associated or disassociated with the system supplied with fluid. It is apparent that any number of pressures can be sensed and connected with separate floating valves arranged so that the cylinders can be connected in series. The passage portion 11c connects with the return line to the fluid supply and contains a restriction 48 of such size as to maintain a minimum system pressure at a given bypass flow rate.

In operation, the regulator 10 will maintain the system supply pressure in passage 12 at a preset differential above the highest of the sensed pressures in passages 18, 36 and 46. In each cylinder, the fluid pressure in the chamber above the floating valve is opposed by the compression spring and the fluid pressure below the valve, and these forces always remain in balance unless the valve is against the physical stop. In other words, the fluid pressure in chambers 13, 30 and 40 are opposed by the fluid pressures in chambers 17, 35 and 45, respectively, and the forces of compression springs 16, 33 and 43, respectively. The pressure differential acting on each valve is represented by the load on each compression spring and the valve position is a function of spring rate, spring preload and pressure differential. It is apparent that under a combination of these forces, each valve can be moved downwardly to communicate the outlet passage portion from each cylinder with the chamber at the end of the adjacent cylinder. When any one of the floating valves has been moved to its dotted line position in FIGURE 1 by the pressure forces on the valve, the fluid bypass passage through the cylinder will be fully opened. The bypass through each cylinder can be varied from fully opened to fully closed and can assume any intermediate valve.

Each floating valve is sized so that a small linear displacement will change the flow through the valve by an amount corresponding to the entire envelope of design flow and pressure requirements. Hence, the change in spring load throughout the full pressure range of operating conditions is small, especially when a light spring rate is used. The valve size, displacement and spring rate are limited by the allowable deviation in the preset pressure differential to be maintained.

It is apparent that flow through valve 15 is a function of the flow area through the valve assembly and the differences in pressures in chambers 13 and 30. In the same manner, the flow through valves 32 and 42 are functions of the flow area and pressure drops across the valves. Since the same flow volume passes through each valve, the ratio of flow area through each valve is a function of the ratio of pressure drop in the flow path through each valve and flow area through each valve is a function of valve linear displacement relative to the housing cylinder.

When the fluid pressure in chamber 45 is greater than the pressure in chambers 35 and 17, valve 42 will position itself to pass sufficient flow to maintain a force balance on the valve and maintain the pressure in chamber 40 at a preset differential above the pressure in chamber 45, as determined by the biasing force of spring 43. The pressure in chamber 40 and passage 11 will be greater than the pressure in chambers 17 and 35 and valves 15 and 32 will be displaced toward the wide-open position so that the pressures in chambers 30 and 13 will equal the pressure in chamber 40, neglecting pressure losses due to flow through the device.

In the event chamber 35 of the second stage senses the highest pressure, the valve 32 will maintain a preset differential between its upstream pressure in passage portion 11a and the pressure which it senses. The valve 42 downstream will maintain a lower pressure in chamber 40 and the valve 15 upstream will be displaced toward its fully opened position and then will introduce only minor pressure drop in the bypass flow passage 11.

In the event that the chamber 17 of the first stage senses the highest working pressure, valve 15 will position itself to bypass sufficient flow from the system to maintain the pressure on the valve in chamber 13 at a preset differential above the pressure in chamber 17. Valve 32 will position itself to maintain a presure in chamber 30 which is a preset differential above the pressure in chamber 35 and valve 42 will be positioned to maintain the pressure in chamber 40 at a preset differential above the pressure in chamber 45. The pressure drops in the flow paths through the valves will determine the position of each valve relative to the housing cylinder to accomplish this result.

Since the restriction 48 is fixed, the minimum system pressure will vary in a known manner with bypass flow rate. A variable restriction could be used in place of fixed restriction 48 so that minimum system pressure could be controlled independently of change in bypass flow rate. In place of a variable restriction, the valve 42 of the last stage in the bypass passage could be used as a variable restriction to maintain a minimum system pressure through proper selection of the spring load of spring 43 and the sensed pressure in passage 46. In addition, a pressure release valve could be utilized in passage 12 to limit the maximum system pressure which could develop. Also, the spring of any stage could be omitted so that the stage will maintain an upstream system pressure which is equal to the sensed pressure at the stage, unless a stage farther upstream is overriding by maintaining a higher pressure than the sensed pressure at the springless stage.

A second modification of the invention is illustrated in FIGURE 2, wherein like reference numerals indicate like parts as in the previous embodiment. This second embodiment utilizes the same components as the embodiment of FIGURE 1 except that the springs 16, 33 and 43 have been replaced by springs 16', 33' and 43' located on the bypass side of the valves 15, 32 and 42, respectively. Also, chambers 13', 30' and 40' are larger than chambers 13, 30 and 40, respectively, in order to house the springs. Since the springs of this second embodiment act against the sensed pressure instead of with the sensed pressure, the regulator 10' will maintain the system pressure at a preset differential below the highest sensed pressure in passages 18, 36 or 46. In other words, the cylinder receiving the highest sensed pressure will move its free floating valve to restrict a portion of passage 11 to control the system pressure and the lower sensed pressures in the other cylinders will cause the corresponding valves to provide larger flow areas. For instance, if the pressure in passage 36 is the highest sensed pressure, the most restricted flow area will be provided by valve 32 and the pressure upstream of this valve will determine the system pressure at a preset value less than the pressure in passage 36 by an amount determined by forces of spring 33'.

Referring to FIGURE 3, a third embodiment of the invention is illustrated wherein like reference numerals again designate like parts as in the previous embodiments. The cylinders 14, 31 and 41 are arranged in parallel and the bypass passage 11 comprises portions 11g and 11h for cylinder 14, portions 11j and 11k for cylinder 31, and portions 11m and 11n for cylinder 41. The return flow passage 11p contains the restriction 48 for maintaining minimum system pressure. Since this embodiment of the regulator comprises a plurality of passage portions arranged in parallel, the lowest pressure sensed in passage 18, 36 or 46 will determine the system pressure in passage 12. The flow through the other stages sensing higher pressures will be ineffective to control system pressure. For example, if the lowest sensed pressure is in passage 18, the valve 15 will be positioned to provide the regulating flow area from passage portion 11g to 11h and the pressure in passage 11g will determine the system pressure in passage 12.

By the present invention, a device for regulating fluid supply pressure is provided which is responsive to a variety of pressures. Any one of the sensed fluid pressures can exist in the system to which fluid is supplied or in some other disassociated system. However, it is understood that the fluid supply pressure can be controlled in accordance with a single sensed pressure by utilizing a single floating valve in a single cylinder to control the bypass flow from the fluid source. The free floating valves could be designed for sealed closure for preventing leakage in the event that bypass flow drops to zero. Also, the valves could be so designed as to completely seal the bypass flow passage from the pressure sensing chambers. Sealed pressure sensing chambers could be provided in the event that one or more of the sensed pressures involve a fluid other than the pressure fluid of the system. Further, the springs of each stage can be made adjustable, and the spring loading and spring rate can be different in each stage. Various other modifications are contemplated by those skilled in the art without departing from the spirit and scope of the invention as hereinafter defined in the appended claims.

What is claimed is:

1. A device for regulating fluid supply pressure to a supply passage comprising a fluid source connected with a supply passage and bypass means for bypassing fluid from said source to control the pressure of the fluid supplied to said supply passage, said bypass means comprising a bypass passage containing a plurality of regulating valves in series for restricting flow through said bypass passage at different locations in said bypass passage, one end of each valve being responsive to the pressure in said bypass passage upstream of the valve, means for introducing a different sensed pressure to the other end of each valve, and means for applying a biasing force to said other ends of the valves to thereby maintain the fluid supply pressure at a preset differential above the maximum sensed pressure introduced to any one of said valves.

2. A regulating device as defined in claim 1, wherein said bypass passage comprises a plurality of passage portions connected in series, each pair of passage portions being connected through a cylinder containing one of said valves for regulating fluid flow from the upstream portion to the downstream portion, each upstream portion being connected to one end of one f said cylinders, said introducing means comprising separate passages each connected to the opposite end of one of said cylinders for introducing a different sensed pressure to each cylinder, each valve being positioned to regulate fluid flow to its downstream passage portion in accordance with the relationship between the upstream and sensed pressures and the biasing force on the valve.

3. A regulating device as defined in claim 2, wherein said biasing force applying means comprises a spring acting on said other end of each valve.

4. A regulating device as defined in claim 2, having a restriction in the downstream passage portion of the last cylinder for providing a minimum supply pressure.

5. A device for regulating fluid supply pressure to a supply passage comprising a fluid source connected with said supply passage and bypass means for bypassing fluid from said source to control the pressure of the fluid supplied to said supply passage, said bypass means comprising a bypass passage containing a plurality of regulating valves in series for restricting flow through said bypass passage at different locations in said bypass passage, one end of each valve being responsive to the pressure in said bypass passage upstream of the valve, means for introducing a different sensed pressure to the other end of each valve, and means for applying a biasing force to said one end of the valve to thereby maintain the fluid supply pressure at a preset differential below the maximum sensed pressure introduced to any one of said valves.

6. A regulating device as defined in claim 5, wherein said bypass passage comprises a plurality of passage portions connected in series, each pair of passage portions being connected through a cylinder containing one of said valves for regulating fluid flow from the upstream portion to the downstream portion, each upstream portion being connected to one end of one of said cylinders, said introducing means comprising separate passages each connected to the opposite end of one of said cylinders for introducing a different sensed pressure to each cylinder, each valve being positioned to regulate fluid flow to its downstream passage portion in accordance with the relationship between the upstream and sensed pressures and the biasing force on the valve.

7. A device for regulating fluid supply pressure to a supply passage comprising a fluid source connected with said supply passage and bypass means for bypassing fluid from said source to control the pressure of the fluid supplied to said supply passage, said bypass means comprising passage means containing a plurality of regulating valves for restricting flow through said passage means at different locations in said passage means, one end of each valve being responsive to the pressure in said passage means upstream of the valve, and means for introducing a different sensed pressure to the other end of each valve in order to position said valves in said passage means and thereby control the fluid supply pressure in the supply passage, said passage means comprising a plurality of passage portions connected in series, each pair of passage portions being connected through one of said regulating valves.

References Cited in the file of this patent

UNITED STATES PATENTS

| | | |
|---|---|---|
| 1,980,591 | MacNicoll | Mar. 13, 1934 |
| 2,817,352 | Barton | Dec. 24, 1957 |
| 2,882,918 | Wright | Apr. 21, 1959 |